Dec. 23, 1958 E. E. LEWIS 2,866,150
CONSTANT FREQUENCY HYDRAULIC DRIVE GENERATOR SYSTEM
Filed Oct. 26, 1953 3 Sheets-Sheet 1
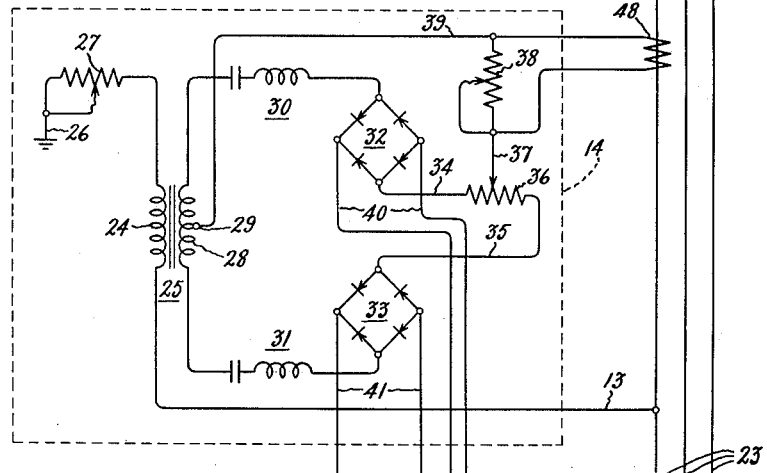
Fig. 1.
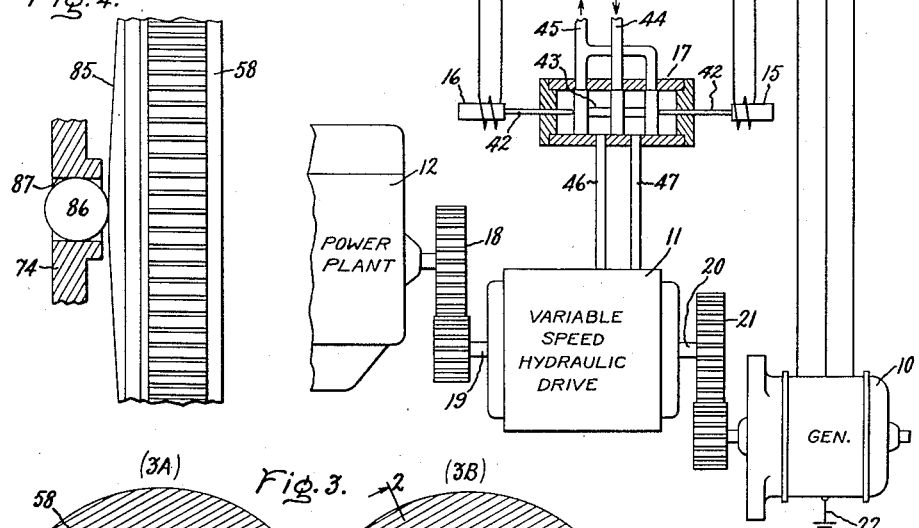
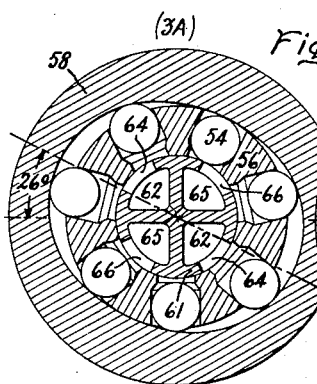
Fig. 4.
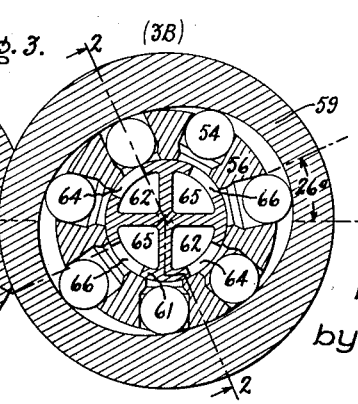
Fig. 3.
Inventor:
Ernest E. Lewis,
by Curtis Ailes Jr.
His Attorney

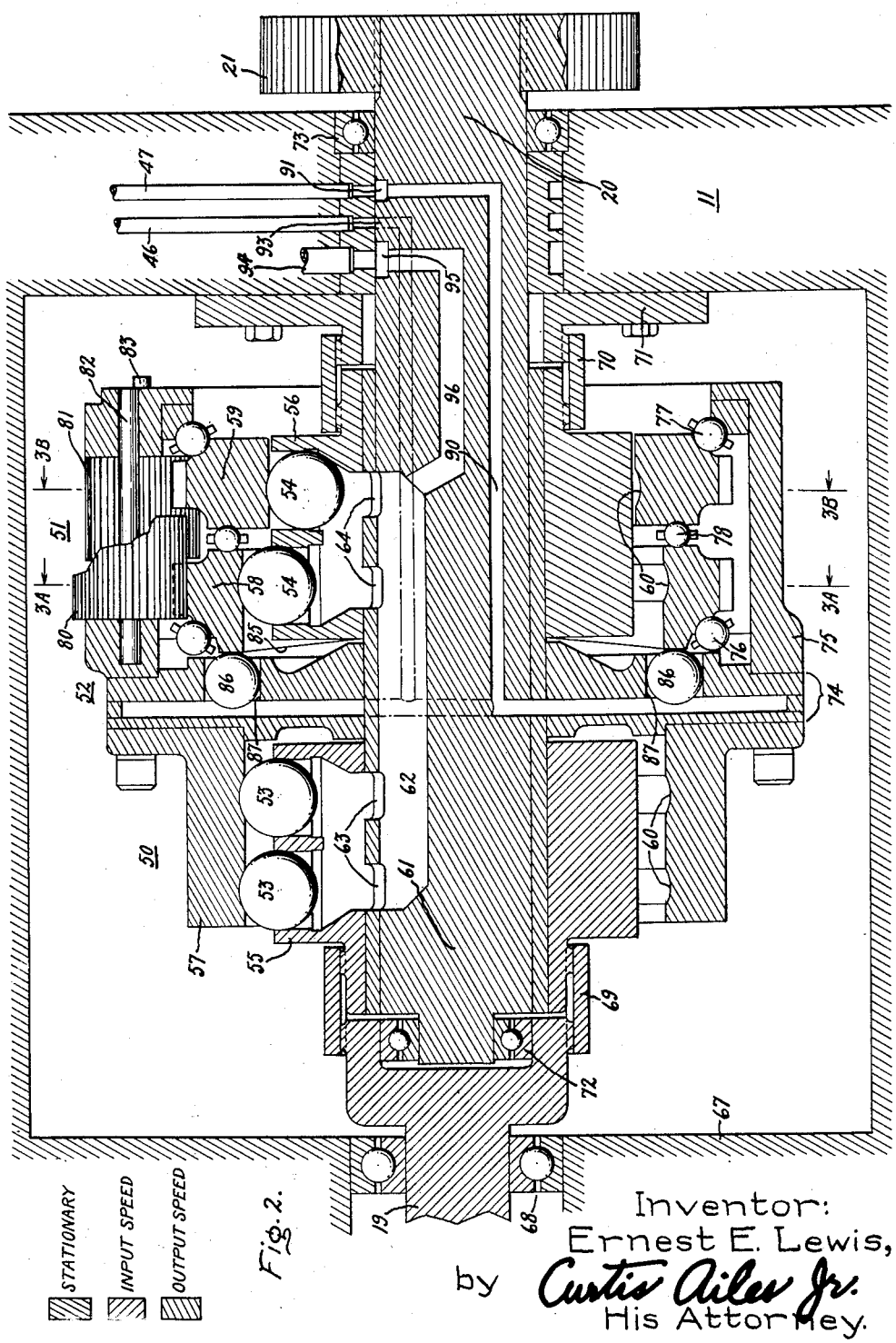

Dec. 23, 1958     E. E. LEWIS     2,866,150
CONSTANT FREQUENCY HYDRAULIC DRIVE GENERATOR SYSTEM
Filed Oct. 26, 1953     3 Sheets-Sheet 3
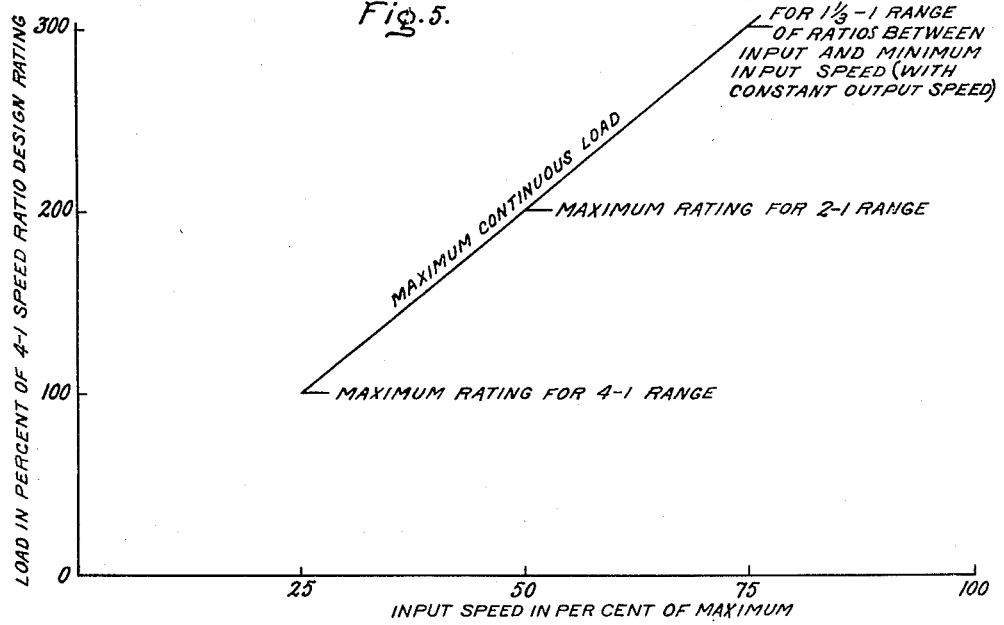
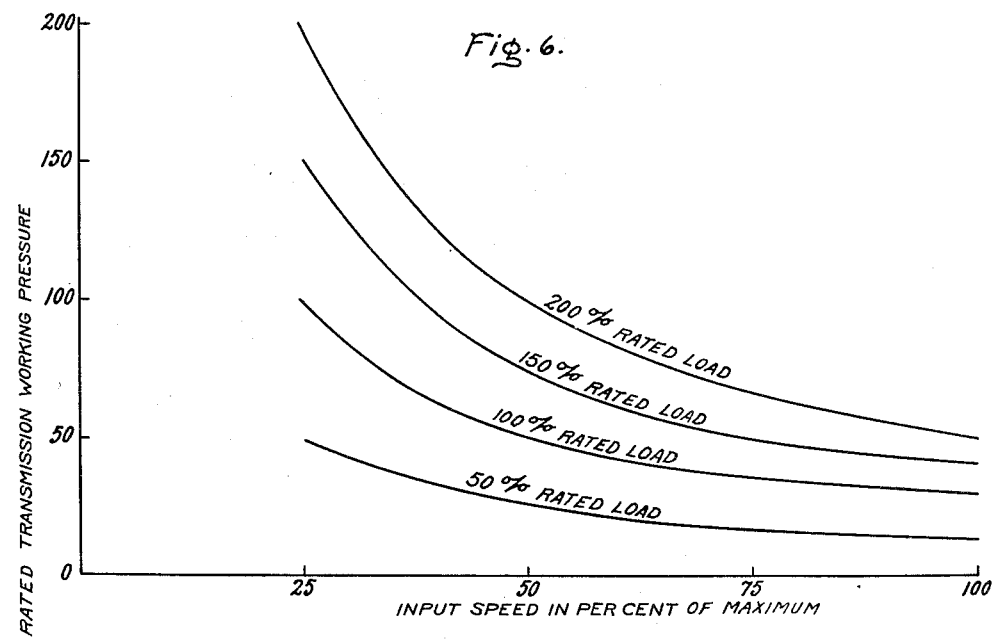
Inventor:
Ernest E. Lewis,
by Curtis Ailes Jr.
His Attorney.

United States Patent Office 2,866,150
Patented Dec. 23, 1958

2,866,150

CONSTANT FREQUENCY HYDRAULIC DRIVE GENERATOR SYSTEM

Ernest E. Lewis, Scotia, N. Y., assignor to General Electric Company, a corporation of New York Application October 26, 1953, Serial No. 388,354

7 Claims. (Cl. 322—32)

This invention relates to hydraulic drive systems and more particularly to such systems which are adapted for operation at varying ratios of mechanical speeds between the input and output thereof and still more particularly to such systems which may be employed for generating a constant frequency voltage from a variable speed mechanical power source.

Various variable speed hydraulic drive systems have been successfully employed in the past, however, each of these prior art systems has included a number of design and performance limitations which are not suffered in the present invention. For instance, these prior art systems have often been of excessive size and weight, have involved phenomenal heat losses, have required the transmission of the entire torque and power through the hydraulic medium, and have not provided an accurate and continuing control of input and output speed ratios.

Accordingly, it is one object of my invention to provide a speed changing hydraulic drive which is characterized by a very compact physical structure with relation to the power capacity thereof.

A further object of the invention is to provide a variable speed hydraulic drive which is characterized by a high degree of ease and accuracy with which the speed ratio may be controlled.

A further object of the invention is to provide a variable speed hydraulic drive in which a portion of the power and torque transmitted therethrough may be transmitted mechanically, and the remaining portion is transmitted hydraulically.

A still further object of the present invention is to provide an improved hydraulic drive which is characterized by high efficiency of operation and low energy loss through friction and heat generation.

In various applications, such, for instance, as in vehicles for travel on land, air or water, it is presently a common requirement that there be a dependable source of electrical energy available when the vehicle power plant is in operation for supplying the requirements of various auxiliary apparatus for the power plant itself and for the vehicle which it may serve. In some of these applications, it has become common to employ alternating current of a frequency as high as 400 cycles per second. Some of the auxiliary apparatus which must be operated from the 400 cycle electrical energy source is extremely sensitive to variations in frequency, requiring a very accurate maintenance of the exact 400 cycle value. Appropriate tolerance limits on the frequency error may be as low as plus or minus one-half of one percent, for instance. The extreme accuracy with which the frequency must be controlled suggests the requirement that the generator which is employed should be driven by a power plant which is separate from, and auxiliary to, the main power plant of the vehicle. However, the provision of such a separate power plant involves the addition of a considerable mass and volume of apparatus. Therefore, a system which may be driven directly by the main vehicle power plant on which the generator speed may be controlled and maintained at the constant value required to maintain constant generator frequency, regardless of varying power plant speeds, will be fundamentally much more efficient and compact than other systems which are presently known for this purpose.

Accordingly, it is a further object of this invention to provide an improved alternating current generation system employing an improved variable speed hydraulic drive connection between a power plant which may rotate at a wide range of speeds and an alternating current generator which must rotate at a very accurately controlled constant speed for the production of a constant frequency.

Other objects and advantages of this invention will be apparent from the following description and the accompanying drawings.

In carrying out the above objects of this invention in one preferred embodiment there may be included a variable speed hydraulic drive which is connected to be driven by a power plant and to drive an alternating current generator. Connected to the alternating current generator is a frequency measurement circuit which controls the positioning of an electromagnetically operated hydraulic valve with respect to a central null position in response to deviations from the desired generator speed and frequency. The valve includes hydraulic connections to the variable drive speed to vary the displacement of a variable positive displacement hydraulic unit therein. The variable displacement unit is operated at the constant output speed and the hydraulic drive also includes a constant positive displacement unit hydraulically coupled to the variable displacement unit, which runs at a variable speed corresponding to the difference between the input and output speeds of the hydraulic drive apparatus. Variation in the displacement of the variable displacement unit controls the ratio of input to output speeds and thus may be used to maintain a constant output speed.

A more complete understanding of the invention may be obtained from the following detailed specification and the accompanying drawings in which:

Fig. 1 is a schematic diagram of a complete alternating current generating system embodying the present invention.

Fig. 2 is a detailed sectional view of a preferred form of the variable speed hydraulic drive apparatus of this invention.

Fig. 3 is a double axial view of two sections of the variable speed drive of Fig. 2 illustrating a preferred structure for changing the fluid displacement thereof.

Fig. 4 is a detail view of a portion of the displacement shifting mechanism of Fig. 2.

Fig. 5 is a diagram showing the relationship between the rated range of speed variation and permissible rated load of the apparatus of Fig. 2.

Fig. 6 is a diagram showing the relationships between speed, rated load, and hydraulic working pressures of the apparatus of Fig. 2.

Referring more particularly to Fig. 1, there is schematically shown a system embodying the present invention and including alternating current generator 10 which is driven at a constant speed through a variable speed hydraulic drive 11 by means of a power plant 12. The power plant 12 may be primarily provided for another purpose such as for the propulsion of a vehicle and in serving that primary purpose, the power plant 12 may be operated at different rates of speed at various times. Accordingly the variable speed hydraulic drive 11 must be controlled in such a manner as to continuously provide a constant output speed to generator 10 from a variable input speed from the power plant 12.

The output frequency of generator 10 is measured through a connection 13 by a frequency control circuit 14. The output of frequency control circuit 14 is fed to solenoids 15 and 16 of a hydraulic control valve 17 to thus control the ratio of input to output speeds of the drive 11 to which it is connected. The structure and mode of operation of the hydraulic drive 11 will be described more fully below in connection with the other figures of the drawings.

The power plant 12 is shown as connected by means of a speed increasing gear train 18 to the input shaft 19 of the hydraulic drive 11. Similarly the hydraulic drive 11 is connected from its output shaft 20 through a speed increasing gear train 21 to the generator 10. It will be understood, of course, that drive connections other than gears could be employed for this purpose and that the gear ratios or the ratios of other similar drives will be chosen to conform to the requirements of the rated generator speed and frequency, the anticipated range of operating speeds of the power plant 12, and the rated speed range of the drive 11.

The generator 10 is shown as having a ground connection indicated at 22 and three output conductors 23 for delivering alternating current power to a suitable electrical load or loads (not shown). As mentioned above, the circuit 14 measures the generator frequency by means of a connection 13 to one of the output conductors 23. The signal from connection 13 is transmitted to the primary winding 24 of a control transformer 25, the other end of which is connected to ground at 26 through a variable resistor 27. Adjustment of the resistor 27 provides an adjustment in the current supplied to winding 24 and a consequent adjustment in the sensitivity of the frequency measurement circuit.

The secondary winding 28 of the transformer 25 includes a center-tap 29 and the two end connections of this secondary winding are respectively connected to series resonant circuits 30 and 31, each of which includes a capacitor and an inductance. The capacitance and inductance of these circuit elements are so chosen that the resonant circuit 30 is tuned to resonate at a frequency slightly above the generator frequency to be maintained and the corresponding frequency of circuit 31 is chosen below the generator frequency to be maintained. Workable frequencies for these circuits for maintenance of a generator frequency of 400 cycles per second have been found to be 440 cycles for circuit 30 and 360 cycles for circuit 31. The return circuit paths for these two resonant circuits respectively include rectification networks 32 and 33 and connections 34 and 35 to the respective ends of a potentiometer 36. From the movable contact 37 of the potentiometer 36, a common return path is provided through a variable resistance 38 and a conductor 39 which returns to the transformer secondary centertap 29.

Across the diagonal corners of the rectification networks 32 and 33 there are respectively connected conductors 40 and 41 to the windings of solenoids 15 and 16 of the control valve 17. It will be seen that these connections 40 and 41 will transmit a rectified component of the current in the resonant circuit branch to which they are respectively connected to the associated solenoid 15 or 16. Each of the solenoids 15 and 16 includes a stem 42 forming an extension of the solenoid core which exerts a compressive force against the associated end of a three land control valve piston 43. The valve 17 includes an inlet hydraulic fluid conduit 44 which may be connected to a suitable source of hydraulic fluid under pressure (not shown) and a discharge conduit 45, connected to a suitable low pressure fluid reservoir (also not shown). Upon displacement of the piston 43 from the central position shown in the drawing, the center land of the piston will uncover the associated port to which the inlet conduit 44 is connected, thus admitting hydraulic pressure fluid to the valve bore interior and thus to one of the hydraulic fluid control lines 46 or 47, connected to the hydraulic drive 11, to change the speed ratio thereof as will be more fully described below.

As long as the generator frequency remains at the desired value, the amount of current passed by the resonant circuits 30 and 31 remains equal, the resultant currents in the windings of solenoids 15 and 16 thus remain equal, the piston 43 of valve 17 thus remains in the central null position shown, and no adjustment in speed is required or made by the hydraulic drive 11. However, if the speed of power plant 12 should increase, causing an increase in the speed and frequency of the generator 10, the higher frequency resonant circuit 30 conducts a larger current and the lower frequency resonant circuit 31 conducts a smaller current and the resultant increase in the energization of the winding of solenoid 15 and decrease in the energization of the winding of solenoid 16 results in a movement of the solenoids and the control valve piston 43 to the left in the drawing. Thus, at least a partial connection is made from the hydraulic pressure fluid inlet 44 to the hydraulic control line 47 to cause an adjustment of the hydraulic drive 11, increasing the ratio of the speeds of the input shaft 19 and the output shaft 20 to appropriately reduce the generator speed and thus reduce the frequency of the output voltage to return the system to the desired frequency. It will be obvious of course that when the center land causes a connection between the input conduit 44 and the control conduit 47, the end land nearest the control conduit 46 at the left end of piston 43 also uncovers the valve port which terminates the associated branch of the discharge conduit 45 to provide a low pressure return connection for the control conduit 46. Upon the occurrence of a generator speed and frequency below that desired, the mode of operation of the system is similar to that described above. An adjustment of the precise frequency to be held for the generator by this control system may be made by adjustment of the movable contact 37 of the potentiometer 36. This adjustment varies the ratio of total impedance in the two branch circuits of which the series resonant circuits 30 and 31 form portions, to adjust the currents in these two resonant circuits and to thus obtain a precise balance of currents in the windings of the solenoids 15 and 16 at the precise generator frequency desired. A current transformer 48 is also provided to measure the current in the generator output conductor to which the frequency detection connection 13 is made and the secondary winding of this current transformer 48 is connected as shown, across the frequency measurement return circuit resistor 38. This connection permits the introduction of a generator load signal into the speed and frequency control circuit 14. For instance, transformer 48 is preferably connected so that changes in the signals received from the load detection circuit in response to an increase in load will cause an increased aid to the resonant circuit 30 and an increased opposition to circuit 31 to cause a load decreasing adjustment operation of the circuit 14 which is superimposed upon the frequency control operation. This feature is important where several generators 10 are to be connected for parallel operation and a proper load division is required by the generators. Adjustment of the resistance of resistor 38 will of course provide an adjustment in the sensitivity of the load control. Adjustment of the movable contact 37 of the potentiometer 36 may also be necessary in order to obtain the precise division of load and frequency which is required. Where control of the division of load between separate generators is not required, the current transformer 48 may be omitted.

Fig. 2 is a detailed view, in section, of the variable speed hydraulic drive 11 of Fig. 1. The control conduits 46 and 47 and the input and output shafts 19 and 20, previously described, have been indicated in this figure. The most essential components of this drive are two expansible chamber liquid pressure positive displacement units indicated generally at 50 and 51, as will be described more fully below. One of these units usually acts as a pump and the other as a motor and these respective functions and modes of operation may be reversed. That is, the first unit 50 may sometimes operate as a pump and sometimes as a motor and when operating as a pump, the second unit 51 operates as a motor. Conversely, when the first unit 50 operates as a motor, the second unit 51 operates as a pump. Also, as will be understood more completely from the following description, the first unit 50 preferably has a constant displacement but operates at various speeds, while the second unit 51 is of variable displacement but operates at a constant speed. A displacement varying mechanism which is indicated generally at 52, for varying the displacement of unit 51, is connected for operation in response to the control pressures within conduits 46 and 47.

Each of the units 50 and 51 preferably includes two axially spaced rows of ball pistons respectively indicated at 53 and 54, which are circumferentially arranged for reciprocation within radial cylinder bores in toroidal cylinder blocks respectively indicated at 55 and 56. A track or ball race is provided to control the reciprocation of the balls 53 and 54. The race member for the first unit 50 is indicated at 57 and the race for the second unit 51 is divided axially into two individual sections 58 and 59 to individually serve the axially separated rows of ball pistons 54. The inner surface of each race preferably includes a groove 60 for supporting each row of balls and the general interior shape of each race, when viewed from an axial direction, is preferably an ellipse. The elliptical shape of the races provides for two cycles of reciprocation of each ball piston for each revolution of relative rotary motion between the race and the associated cylinder block. The ball pistons 53 and 54 are held radially outwardly against the races by hydraulic fluid pressure from the inner ends of the respective cylinders and also by centrifugal force where the associated cylinder block rotates.

Passing through the centers of the cylinder blocks 55 and 56 there is a pintle shaft 61 containing liquid passages, one of which is indicated at 62, having ports such as indicated at 63 and 64 which establish connections between various cylinder bores of the respective units 50 and 51 at various respective rotational positions of the cylinder blocks 55 and 56 and the pintle 61.

Fig. 3 is a partial view of a section taken at 3A in Fig. 2 on which is partially superimposed a section taken at 3B in Fig. 2. This combined sectional view will be referred to more fully below in connection with the description of the displacement varying mechanism referred to generally above as 52. However, Fig. 3 clearly illustrates the elliptical inner shape of the ball races 58 and 59 and the arrangement of the pintle passages 62 and ports 64. The pintle passages are seen to be four in number with diagonally opposite passages being interconnected by small diagonal openings. The interconnected passages have been indicated in Fig. 3 with like numbers. The pair of passages intermediate the passages 62 have been designated as 65 and the associated ports as 66. It will be appreciated that when the passages 62 and the associated ports 64 are operating as a hydraulic fluid inlet for the associated pistons 54, the passages 65 and ports 66 are conversely acting as an outlet system. Thus, the pintle 61 and its associated passages and ports serve as a combined valving mechanism and conduit for the conveyance of hydraulic fluid to and from each unit.

In order to assist in the undertaking of Fig. 2, a section line identified as 2—2 in the (3B) portion of Fig. 3 indicates the section which has been taken for Fig. 2. Referring again more particularly to Fig. 2, it will be noted that for greater clarity and easier understanding of the operation of the hydraulic drive system a distinctive cross-hatching has been employed to separately distinguish those portions of the system rotating at the input speed, at the output speed, and those which remain stationary. It will be seen from the key given on Fig. 2 that those parts rotating at the input speed and connected to the input shaft 19 are cross-hatched downwardly at 45° from left to right whereas the parts rotating at the output speed, with the output shaft 20, are cross-hatched upwardly at 30° from the horizontal from left to right and those parts which are stationary are cross-hatched upwardly at 60° from the horizontal from left to right.

The entire hydraulic drive unit 11 is enclosed in a suitable stationary housing indicated at 67. The input shaft 19 is supported within a shaft opening in the housing 67 by means of a suitable anti-friction bearing 68. An additional bearing (not shown) preferably may also be provided for the shaft 19 to the left of bearing 68 in the drawing. The shaft 19 includes an enlarged inner end which is connected by means of a spline sleeve 69 to the cylinder block 55 of the first unit 50. The input shaft thus rotates the cylinder block 55 at the input speed, and these parts, including the associated connection sleeve 69 and the ball pistons 53 are the only portions of the hydraulic drive unit 11 which rotate at the input speed. The cylinder block 56 of the second unit is similarly connected by means of a spline sleeve 70 to a flange 71 which is fixedly mounted to the casing 67. Thus, the cylinder block 56 of the second unit 51 is fixed so that it does not rotate.

The pintle 61 forms an inner extension of the output shaft 20, and is supported by means of suitable anti-friction bearings 72 and 73 which are respectively located at the left end of the pintle within a recess at the inner end of the input shaft 19 and at the right end of the pintle or output shaft within the housing 67. Connected to the pintle 61, for rotation therewith, at a point intermediate the two cylinder blocks 55 and 56, there is a carrier member 74, which is in the form of a disk or a wheel, to the outer periphery of which are fastened the first unit race 57 and a cage member 75 enclosing and supporting the second unit races 58 and 59. The individual races 58 and 59 are supported within the cage member 75 for rotation with respect thereto by means of suitable bearings such as the ball bearings 76 and 77. These races are also maintained in a spaced apart relationship with one another for relative rotation by suitable thrust bearings such as ball bearings 78.

The outer peripheral portions of the races 58 and 59 are provided with gear teeth, and these gear teeth are meshed with individual pinion gears respectively indicated at 80 and 81, which are respectively journaled for rotation on shafts 82 and 83 connected to and supported within the cage member 75. The pinion gears 80 and 81 are also meshed with one another. Therefore, unless the pinions 80 and 81 rotate, the stroking races 58 and 59 will remain fixed with respect to the cage member 75 and will thus rotate together with that cage member. Since each of the races 58 and 59 are in mesh with one of the pinions 80 and 81, and the pinions 80 and 81 are in mesh with one another, it will be seen that any rotation of the race 58 with respect to the cage 75 will be accompanied by an equal rotation in the opposite direction of the race 59 by reason of the driving interconnection provided by the pinions 80 and 81.

If the races 58 and 59 are in precise rotational alinement so that the outer lobes of the elliptical shapes thereof are alined, the unit 51 will have a maximum displacement. If, however, the races 58 and 59 are rotated with respect to one another and with respect to the cage member 75, as described above, what may be described as a controlled rotational misalinement occurs which reduces the over-all displacement of the unit 51 because of the two halves of the unit respectively served by the races 58 and 59 are effectively out of phase with one another. This condition of the races 58 and 59 is illustrated in Fig. 3 in which the displacement of each race from the horizontally alined position is approximately 26°. The displacement between the respective races thus totals 52°. It will be appreciated that when each race is displaced 45° so that the respective displacement totals 90°, the races will be completely out of phase and the unit 51 will therefore have a net displacement of zero. Further relative rotation of the races therefore similarly causes a reversal in the displacement of this unit until exact alinement in the vertical provides a maximum displacement in the opposite direction.

Control of the displacement of unit 52 by relative rotation of the races 58 and 59 as described above, is obtained by means of the displacement shifting mechanism 52 generally referred to above. This mechanism includes an axially inclined cam surface 85 formed on the side wall of race 58 against which ball pistons 86 are arranged to operate. As will be seen from the drawing, these pistons 86 are reciprocably mounted in axially alined cylinder bores 87 formed in the support member 74. Although there are only two pistons 86 shown in the drawing, there are preferably four such pistons provided, with diagonally opposite pairs of pistons operating together against the cam surface 85. In this four piston displacement shifting mechanism the cam 85 is symmetrically formed with two diagonally opposite "hills" and two diagonally opposite "valleys" arranged midway between the "hills." The intermediate portions of the cam 85 between each "hill" and "valley" forms an inclined plane. It will thus be seen that adjustments in the pressures upon the ball pistons 86 and the intermediately disposed pair of similar pistons will cause a rotational adjustment of the position of race 58 and a resulting opposite adjustment of the race 59 with respect to the cage member 75 as described above. The structure of the cam 85 and the relationship with the associated parts, described above, is more fully shown in the partial detail view of Fig. 4.

In order to establish changes in the pressures of the displacement shifting ball pistons 86 on the cam 85, a hydraulic connection is provided as shown at 90 from the cylinder bore 87 through the support member 74 and the pintle 61 and a suitable pintle port 91 to the control conduit 47. The intermediate displacement shifting ball pistons which are not shown in Fig. 2, are similarly connected by means of a similar conduit 92 and pintle port 93 to the control conduit 46. Thus, a shift in the displacement of the second unit 51 is accomplished hydraulically through the control pressure conduits 46 and 47 under the control of solenoid valve 17 and the circuit 14 as previously described in connection with Fig. 1.

An additional conduit 94 is provided which is connected through a pintle port 95 and a pintle passage 96 to the passage 62 to provide hydraulic fluid under pressure from a suitable source (not shown) to make up for fluid losses due to leakages within the hydraulic drive 11.

*Operation of hydraulic drive*

The operation of the over-all system has been described generally above in connection with Fig. 1. The detailed operation of the hydraulic drive 11 is described below. When operated as an underdrive, that is, where the speed of the input shaft 19 is greater than the speed of the output shaft 20, the input torque is transmitted through the shaft 19, and the sleeve 69, to the first unit cylinder block 55. From the cylinder block 55 the torque is further transmitted through the ball pistons 53 to the first unit race 57 and thus to the support member 74 and the pintle 61 and output shaft 20. In order to obtain transmission of torque from the cylinder block 55 to the race 57 through the ball pistons 53, it is obvious that some restraint must be provided to prevent unrestricted reciprocation of the ball pistons 53. This restraint is provided by operation of the first unit 50 as a pump to pump the hydraulic fluid from the first unit 50 to the second unit 51, the second unit 51 operating analogously to a variable load device or hydraulic restriction. It will be seen then that the amount of "slippage" of the first unit, or the excess in the speed of the cylinder block 55 over that of the race 57, is controllable by control of the displacement of the second unit 51 through the displacement varying mechanism 52 and the control conduits 46 and 47, etc. The first unit 50 may be referred to below therefore as a variable slip device in contemplation of the above theory of operation.

However, when the second unit 51 acts as a variable load or obstruction to the passage of hydraulic fluid it also, by its nature, operates as a hydraulic fluid motor. The unit 51 thus produces an output torque starting with a reaction force transmitted through the fixedly mounted cylinder block 56 and transmitted through ball pistons 54 to the races 58 and 59 and thus to the cage member 75, the support member 74, the pintle 61, and the output shaft 20. Therefore, it may be said that a portion of the input torque from shaft 19 is transmitted through the first unit cylinder block 55 and the ball pistons 53 through the hydraulic fluid interconnecting the pistons 53 of the first unit 50 and the pistons 54 of the second unit 51 to the second unit races 58 and 59 and thus to the output shaft 20 as described above. As described in the previous paragraph, a portion of the input torque from input shaft 19 is also transmitted directly from the cylinder block 55 to the first unit race 57 and thus to the output shaft 20. It may thus be said that the torque and power is transmitted through this hydraulic drive unit by a combination of mechanical and hydraulic connections between the input and output shafts. The mechanical connection is provided between the first unit cylinder block 55 and the first unit race 57 by means of the ball pistons 53, and the hydraulic connection is provided as described above, from the first unit cylinder block 55 to the ball pistons 53, the hydraulic connection to the second unit ball pistons 54 and the second unit races 58 and 59.

As mentioned above, a change in the displacement of the second unit 51 by operation of the displacement change mechanism 52 under the control of the pressure changes from control pressure conduits 46 and 47 not only changes the restriction to the passage of hydraulic fluid pumped from the first unit 50, but it also changes the motoring operation for the hydraulic transfer of torque by the second unit 51. It will be seen from the above description that when this variable speed hydraulic drive apparatus is employed to produce a constant output speed, the effective speed of the first unit, that is the speed between the cylinder block 55 and the race 57, is the difference between the input and output speeds, which will vary as the input speed varies. On the other hand, the effective speed of the second unit 51, that is the speed between the cylinder block 56 and the races 58 and 59, is equal to the constant output speed. The first unit 50 is thus seen to be a constant displacement unit operable at a variable speed and the second unit 51 a variable displacement unit operated at constant speed. It will be appreciated that the first unit 50 rather than the second unit 51 might be provided with the variable displacement feature. However, it is preferred to vary the displacement of the second unit. Similarly, it may be possible to modify this apparatus by interchanging the respective mechanical connections of the cylinder block and races of either of the units 50 or 51 although the arrangement shown is preferred.

The hydraulic drive 11 has been described above as an underdrive system in which the input shaft rotates at a speed in excess of the output shaft speed. This is most efficient mode of operation of the drive ratios as will be apparent from the discussion below, particularly in connection with the operating characteristic curves presented in Figs. 5 and 6. In view of this, the drive apparatus 11 may be accurately and appropriately described as an "underdrive."

However, it will be seen that as the displacement of the second unit 51 is reduced in the underdrive range of operation, the ratio of input to output speeds will decrease to a point where a one to one ratio is achieved, at which time the first unit 50 has no effective speed between the cylinder block 55 and the race 57 and there is a very slight reverse displacement of the second unit 51 in order to operate the second unit as a pump, to make up for leakage losses.

If the displacement of the second unit 51 is increased in the reverse direction (with reference to the previous mode of operation) the second unit 51 must necessarily operate as a pump of greater displacement, which pumps hydraulic fluid to the only recipient mechanism to which it is connected, the first unit 50. The first unit 50 will then operate as a hydraulic fluid motor to drive the first unit race 57 and the output shaft 20 at a faster speed than the cylinder block 55 and the input shaft 19. It will be understood that the ratio of the input to output speeds will again depend on the displacement of the second unit 51 as controlled through the hydraulic fluid control lines 46 and 47, a maximum displacement providing for a maximum speed increase between the input and output shafts. This mode of operation may be described as "overdrive."

In the underdrive mode of operation the maximum displacement of the second unit 51 will likewise provide the maximum ratio of input to output speeds and the greatest speed reduction. Thus, the maximum displacement of the units 50 and 51 governs the outer limits of the ratios of input to output speeds available from the hydraulic drive apparatus 11. Therefore, if the desired speed ratio falls outside of the range of speed ratios to which the hydraulic drive 11 can accommodate, the drive operates at the limit represented by the maximum displacement of the second unit 51, and is effectively a fixed ratio drive when operated at that limit. Of course, the hydraulic drive 11 and the associated apparatus normally will be so designed and chosen to provide for the variable controlled speed ratio operation over the entire anticipated operating range of speeds.

Although the units 50 and 51 are shown as having equal maximum displacements, it will be understood that they may be constructed in unequal sizes and having unequal maximum displacements.

Because of the inherent characteristics of the hydraulic drive apparatus, 11, the efficiency of this drive is much higher in the upper range of input speeds. Thus, if the required range of the ratio of input to output speeds is not great, the drive may be designed to employ only the required upper portion of the range of speed ratios of which it is capable and a higher nominal horsepower rating for a unit of a given size will be possible. As suggested above, this high range may include only the underdrive mode of operation. This variation in possible maximum load rating for a unit of given size, in relation to the required speed ratio range is shown by the curves plotted in Fig. 5. Similarly, Fig. 6 is a plot of working pressures within the drive 11 versus input speed. These curves show that the pressure decreases as the input speed increases so that greater efficiences in terms of operation at lower pressures are obtainable at high input speeds. This is important because the rate of wear in a hydraulic unit is dependent upon the pressures under which it is operated.

The following claims are intended to define the valid scope of this invention over the prior art and to cover all changes and modifications falling within the true spirit and valid scope of the invention.

What I claim as new and desire to secure by Letters Patent of the United States is:

1. A variable speed hydraulic drive system comprising two ball piston positive displacement hydraulic units, each of said units comprising at least one annular cylinder block having radial cylinder bores therein, a ball piston supported for reciprocation within each of said bores, a stroking member for each of said units comprising a race surrounding said cylinder block having an inner circumference of variable radial spacing from the axis of said block for coaction with said ball pistons, a common pintle threading the center openings of both of said cylinder blocks, ports and interconnecting passages within said pintle for respectively providing a valving opening and interconnections between the cylinder bores of said respective units, rotatable power input and output members, said stroking members for both of said units and said pintle being connected to said power output member and the cylinder block of one of said units being connected to said input member, the cylinder block of the other of said units being fixed, apparatus for varying and reversing the phase of displacement of one of said units to vary the speed ratio of said input and output members, and the displacement of the other of said units being fixed.

2. A variable speed hydraulic drive system comprising rotatable power input and output members, first and second positive liquid displacement units hydraulically interconnected in a closed loop and each comprising annular cylinder blocks having two axially spaced rows of radial cylinder bores therein, a ball piston supported for reciprocation in each of said bores, a stroking member for each of said units surrounding the associated cylinder block and having a radially variably spaced inner surface for coaction with said ball pistons in the reciprocatory motion thereof, said stroking member of said first unit being fixed to said output member to provide constant displacement, said cylinder block of said first unit being connected to said input member, said cylinder block of said second unit being nonrotatably supported, said stroking member of said second unit being comprised of axially separated sections for coaction with said ball pistons of said respective axially spaced rows of cylinder bores, a supporting cage for said sections connected to said output member, and apparatus for rotatably shifting said axially spaced stroking member sections in opposite directions with respect to said cage for varying and reversing the resultant displacement of said second unit.

3. A nonreversible variable speed hydraulic drive having a constantly maintainable but smoothly variable ratio of input to output speeds extending by a predetermined range both above and below a one to one ratio comprising input and output shafts, first and second radial cylinder ball piston units each comprising an annular cylinder block having radially disposed cylinder bores, a ball piston supported within each of said bores, stroking members comprising races for coaction with said ball pistons surrounding said cylinder blocks, at least portions of each of said races having inner surfaces arranged eccentrically with respect to said cylinder blocks to impart a reciprocatory motion to said ball pistons upon relative rotation between said cylinder blocks and said associated races, a pintle shaft extending through the central portions of said cylinder blocks, said pintle including fluid ports and passageways to provide a valving connection between the cylinder bores of said respective units upon relative rotation between said pintle and said cylinder blocks, said first unit cylinder block being connected to said input member, said pintle and said races of both of said units being connected for rotation with said output member, said second unit cylinder block being nonrotatably fixed, the eccentricity of said race of said first unit being fixed, and apparatus for changing and reversing the eccentricity of said race of said second unit to vary the speed ratio between said input and output shafts.

4. A variable speed hydraulic drive system comprising rotatable power input and output members, first and second positive liquid displacement units each comprising annular cylinder blocks having two axially spaced rows of radial cylinder bores therein, hydraulic interconnections between said blocks to form a closed loop for the interchange of liquid between said units, a ball piston supported for reciprocation in each of said bores, a stroking member for each of said units surrounding the associated cylinder block and having a radially variably spaced inner surface for coaction with said ball pistons in the reciprocatory motion thereof, said stroking member of both of said units being connected to said output member, said cylinder block of said first unit being connected to said input member, said cylinder block of said second unit being nonrotatably supported, said stroking member of one of said units being comprised of axially separated sections for coaction with said ball pistons of said respective axially spaced rows of cylinder bores, each of said sections having gear teeth on the outer periphery thereof and a pinion meshing with said gear teeth, said pinions being intermeshed with one another, a supporting cage for said axially separated sections connected to said output member, said pinions being rotatably supported on said cage, and apparatus for driving one of said sections for rotatably shifting both of said sections in opposite directions with respect to said cage for varying and reversing the displacement of said unit, the displacement of said other unit being fixed.

5. A variable speed hydraulic drive system comprising rotatable power input and output members, first and second positive liquid displacement units each comprising annular cylinder blocks having two axially spaced rows of radial cylinder bores therein, hydraulic interconnections between said blocks to form a closed loop for the interchange of liquid between said units, a ball piston supported for reciprocation in each of said bores, a stroking member for each of said units surrounding the associated cylinder block and having an elliptical inner surface for coaction with said ball pistons in the reciprocatory motion thereof, said stroking member of said first unit being connected to said output member, said cylinder block of said first unit being connected to said input member, said cylinder block of said second unit being nonrotatably supported, said stroking member of said second unit being comprised of axially separated sections for coaction with said ball pistons of said respective axially spaced rows of cylinder bores, each of said sections having gear teeth on the outer periphery thereof and a pinion meshing with said gear teeth, said pinions being intermeshed with one another, a supporting cage for said sections connected to said output member, said pinions being rotatably supported on said cage, one of said sections including an axially variable cam surface on one side thereof, a plurality of ball pistons engaging said cam surface, said cage member including axially aligned cylinder bores for supporting said last named ball pistons, and hydraulic connections for varying the pressures on said last named ball pistons for rotatably shifting said axially spaced stroking member sections in opposite directions with respect to said cage for varying and reversing the displacement of said second unit.

6. A constant frequency alternating current generating system for use with a variable speed power plant comprising a variable speed hydraulic drive having an input member for connection to said power plant and having an output member, a constant positive liquid displacement unit having a constant displacement unit and a variable displacement unit and connected between said input and output members, a variable and reversible positive liquid displacement unit connected between a fixed support and said output member, said units being hydraulically interconnected in a closed loop hydraulic circuit, a generator connected to said output member, a frequency detection circuit including two resonant circuit portions having resonant frequencies respectively above and below the desired generator frequency connected to measure the frequency of said generator, a solenoid operated hydraulic control valve including electrical solenoids connected for energization from said circuit, said solenoids being arranged to displace said valve from a central null position upon energization thereof in response to a deviation from the desired frequency of said generator as measured by said circuit, and hydraulic connections from said control valve to said variable displacement unit and operatively coupled to said variable displacement unit for varying the displacement thereof in response to movements of said valve to vary the ratio of speeds of said input and output members to maintain the desired generator speed and frequency.

7. A displacement shifting mechanism in a variable speed hydraulic drive with a constant displacement unit and a variable displacement unit comprising an axially inclined cam surface connected in operative relationship to the displacement varying means of said variable displacement unit, a number of radially spaced ball pistons reciprocably mounted between the constant and variable displacement units in axially aligned cylinder bores and operatively engaging said cam surface, speed controlled pressure means axially actuating said ball pistons for rotationally adjusting the position of said cam surface to thereby shift the displacement of the related variable displacement unit.

References Cited in the file of this patent

UNITED STATES PATENTS

| | | |
|---|---|---|
| 711,662 | Herdman | Oct. 21, 1902 |
| 1,325,434 | Carey et al. | Dec. 16, 1919 |
| 1,924,017 | Bedford | Aug. 22, 1933 |
| 2,074,583 | Golz | Mar. 23, 1937 |
| 2,220,636 | Bischof | Nov. 5, 1940 |
| 2,227,631 | Carter | Jan. 7, 1941 |
| 2,260,859 | Neuland | Oct. 28, 1941 |
| 2,509,728 | Desch et al. | May 30, 1950 |
| 2,646,755 | Joy | July 28, 1953 |

FOREIGN PATENTS

| | | |
|---|---|---|
| 201,235 | Great Britain | July 26, 1923 |